123,166

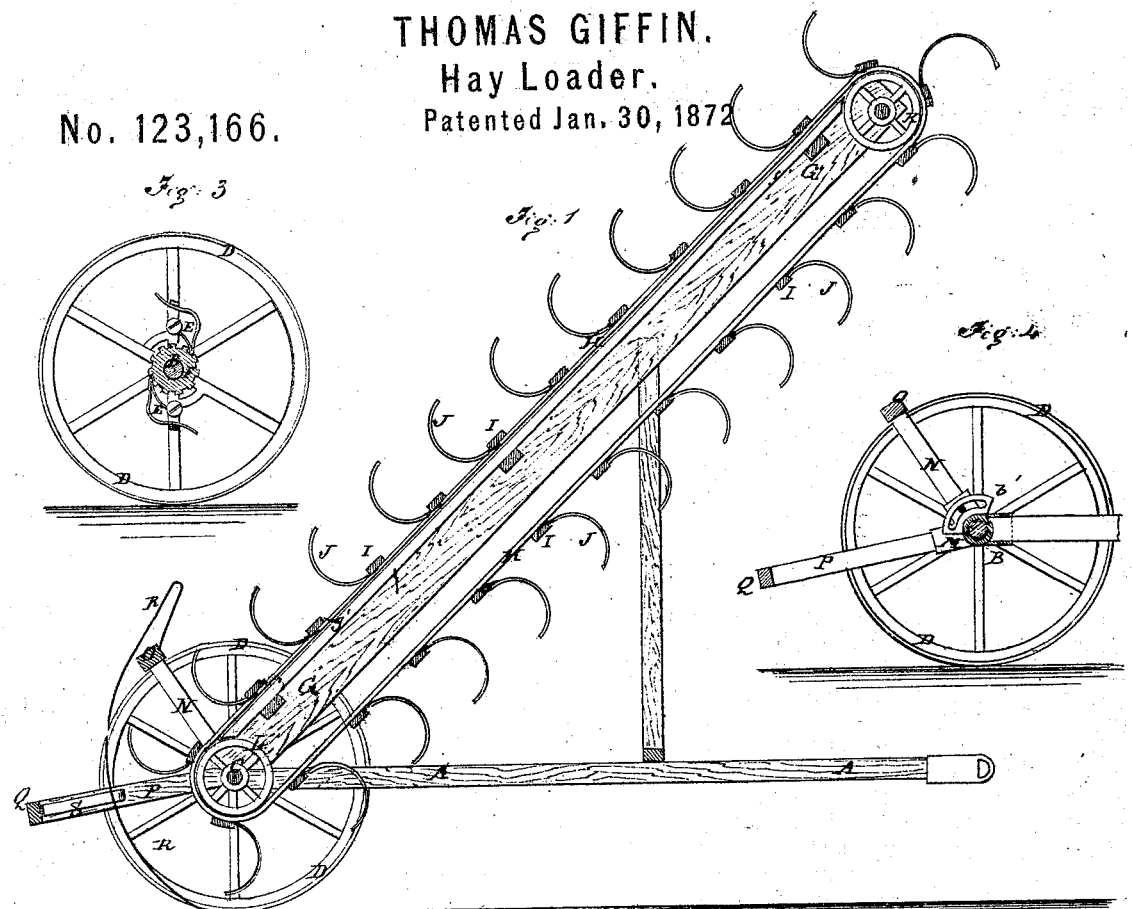

UNITED STATES PATENT OFFICE.

THOMAS GIFFIN, OF PERRYSVILLE, OHIO.

IMPROVEMENT IN HAY-LOADERS.

Specification forming part of Letters Patent No. 123,166, dated January 30, 1872.

Specification describing a new and Improved Hay-Loader, invented by THOMAS GIFFIN, of Perrysville, in the county of Ashland and State of Ohio.

Figure 1 is a detail vertical longitudinal section of my improved machine taken through the line $x\ x$, Fig. 2. Fig. 2 is a top view of the same. Fig. 3 is a detail section taken through the line $y\ y$, Fig. 2. Fig. 4 is a detail section taken through the line $z\ z$, Fig. 2.

Similar letters of reference indicate corresponding parts.

My invention has for its object to furnish an improved machine for loading hay spread upon the ground directly upon the wagon, and which shall be simple in construction, convenient in use, and effective in operation; and it consists in the construction and arrangement of various parts of the machine, as hereinafter more fully described.

A is a triangular frame, the forward end or angle of which is designed to be secured to the rear axle of an ordinary hay-wagon. The rear ends of the side bars of the frame A are bolted to flanges formed upon or attached to the bearings B, in which the axle C works. D are the drive-wheels, which revolve upon the journals of the axle C, and are made to carry the said axle with them, when turned forward, by the spring-pawls E attached to the spokes of the wheels D, and which take hold of the ratchet-wheels E, keyed to the end of the axle C, and which are made with a flange around their outer edges, to protect their teeth. To flanges formed upon or attached to the bearings B are securely bolted the lower ends of the carrier-frame G, to the side bars and to the center of the cross-bars of which are attached strips $g'$ to support the endless belts H of the carrier. To the endless belts H, at suitable distances apart, are attached cross-bars I, to which is attached a suitable number of curved wire teeth, J, by which the hay is taken from the rake, carried up, and discharged upon the wagon. To the upper part of the frame G are pivoted three wheels, K, for the endless belts H to pass around. To the axles C are keyed or otherwise secured three wheels, L, around which the endless belts H pass, and by which the carrier is operated by the revolution of the said axle C. M is a casting, placed upon the axle C, between the bearings B and the drive-wheels D, and which is made with two sockets projecting at right angles, or nearly at right angles, with each other. The castings M are arranged upon the axle C with one socket projecting upward and the other to the rearward. To the upwardly-projecting sockets of the casting M are secured the lower ends of the bars N, the upper ends of which are connected by a cross-bar, O. The bars N are made of such a height that the teeth J of the carrier may pass beneath them. To the rearwardly-projecting sockets of the castings M are attached the forward ends of the rearwardly-projecting bars P, which are made somewhat longer than the bars N, and their rear ends are connected by a cross-bar, Q. To the cross-bar O are attached the ends of a series of wire teeth, R, which project upward, are bent back upon themselves, project downward, and are curved forward so as to come to the ground directly beneath the lower and rear end of the carrier. The teeth R pass down through slotted or looped guides S, which are secured to the cross-bar Q, and project forward to receive the teeth R, so that should said teeth R, or either of them, strike a stone or other obstruction, they may yield and again spring forward to their place when the obstruction has been passed. To the casting M is attached a bolt, which passes through a curved slot in a flange, $b'$, formed upon the bearings B, so that the teeth R may be conveniently adjusted to work at any desired closeness to the ground, or away from the ground, for passing from place to place, and when adjusted may be firmly secured in place by simply loosening and tightening the nuts of the said bolts.

Having thus described my invention, I claim as new and desire to secure by Letters Patent—

1. The combination of the bearings B $b'$, castings M, arranged upon the axle C, and frame-work of the machine, substantially as herein shown and described, and for the purposes set forth.

2. The combination of the rake-teeth R and guides S with the frame-work N O P Q and carrier, substantially as herein shown and described, and for the purpose set forth.

THOMAS GIFFIN.

Witnesses:
A. D. ZIMMERMAN,
L. P. ZIMMERMAN.